(12) United States Patent
Sugiyama et al.

(10) Patent No.: US 6,481,521 B2
(45) Date of Patent: Nov. 19, 2002

(54) UNDER-CART TYPE GUIDED TRACTOR

(75) Inventors: Motohiro Sugiyama; Kazunori Ooishi, both of Shizuoka (JP)

(73) Assignee: Yazaki Industrial Chemical Co., Ltd., Shizuoka (JP)

( * ) Notice: Subject to any disclaimer, the term of this patent is extended or adjusted under 35 U.S.C. 154(b) by 0 days.

(21) Appl. No.: 09/804,605

(22) Filed: Mar. 12, 2001

(65) Prior Publication Data

US 2002/0074172 A1 Jun. 20, 2002

(51) Int. Cl.$^7$ ............................................. B60T 7/16
(52) U.S. Cl. ..................... 180/168; 180/22; 280/489
(58) Field of Search ............................. 180/168, 6.48, 180/6.5, 24.07, 22, 311; 280/489

(56) References Cited

U.S. PATENT DOCUMENTS

| | | | | |
|---|---|---|---|---|
| 2,195,636 A | * | 4/1940 | Ulrich | 180/168 |
| 2,823,047 A | * | 2/1958 | Hutchinson | 180/168 |
| 3,827,721 A | * | 8/1974 | Coval | 180/168 |
| 3,944,258 A | * | 3/1976 | Christensen | 280/489 X |
| 4,073,369 A | * | 2/1978 | Nordskog | 180/168 |
| 4,077,535 A | * | 3/1978 | Oriol | 180/168 |
| 5,201,819 A | * | 4/1993 | Shiraishi et al. | 180/168 |
| 5,434,490 A | * | 7/1995 | Ishida et al. | 180/168 |
| 5,525,884 A | * | 6/1996 | Sugiura et al. | 180/168 |
| 5,624,004 A | * | 4/1997 | Watanabe | 180/168 |
| 5,988,306 A | * | 11/1999 | Ooishi | 180/168 |
| 6,237,504 B1 | * | 5/2001 | Tanahashi et al. | 180/168 X |

FOREIGN PATENT DOCUMENTS

| | | | | |
|---|---|---|---|---|
| JP | A0053212 | * | 3/1984 | 180/168 |
| JP | 404138964 | * | 5/1992 | 180/168 |

\* cited by examiner

*Primary Examiner*—Paul N. Dickson
*Assistant Examiner*—Toan C To
(74) *Attorney, Agent, or Firm*—Dellett and Walters

(57) ABSTRACT

An under-cart type guided tractor comprising a frame provided with a driving unit including driving wheels on the underside thereof, the guided tractor being adapted to travel guided by a guide signal sent out from a guide element, such as a magnetic tape laid along a traveling path on a floor surface, and to draw a cart provided with free wheels and loaded with goods, with the guided tractor located under a load-carrying platform of the cart.

The frame of the guided tractor has a height that allows the guided tractor to move under the frame of the cart, and a structure that does not allow the vertical load of the cart to act on the guided tractor. The frame of the guided tractor comprises at least two separate frame components that are arranged in line with the travelling direction of the guided tractor and joined by a pin in a manner such that the frame components are allowed to take an upward or downward bent formation. The frame of the guided tractor is provided with free wheels that are adapted to travel on the floor surface along with the driving wheels. The frame components are equipped with a clamp mechanism capable of being raised and lowered, the clamp mechanism being adapted to be raised and clamp the frame of the cart when the guided tractor has come to an appropriate position under the frame of the cart. A sensor is provided at a portion suitable for detecting the guide signal sent out from the guide element, such as a magnetic tape.

12 Claims, 8 Drawing Sheets

UNDER-CART TYPE GUIDED TRACTOR

BACKGROUND OF THE INVENTION

The present invention relates to an automatic under-cart type guided tractor comprised of a frame with a driving unit and driving wheels on the underside, which guided tractor is constructed in order to travel guided by a guide signal sent out from a guide element, such as a magnetic tape laid along a path on a floor surface in a factory or a warehouse, and to pull a cart provided with free wheels and loaded with goods, with the guided tractor located under a load-carrying platform of the cart.

Conventionally with an under-cart type guided tractor an undivided rigid plate-like frame is used and the driving wheels are attached at the center of the underside of the frame by a suspension mechanism using a plate spring, a coil spring or the like. The suspension mechanism prevents the driving wheels from losing contact with the floor surface, (the traveling path surface), due to irregularities in the surface, ensures appropriate surface friction, and thereby enables the under-cart type guided tractor to travel smoothly.

However, the suspension mechanism using such a plate spring, a coil spring or the like cannot cope with relatively large irregularities in the surface, such as slopes, waves or the like, although it can cope with small bumps on the floor surface.

Thus, the conventional under-cart type guided tractor has a problem, when, for example, the guided tractor passes over a convex portion of the floor surface, the surface friction increases, and when it passes over a concave portion of the floor surface, the surface friction decreases, thus the appropriate surface friction is not ensured. When these irregularities in the floor surface are relatively large, such as slopes, waves or the like, the cart and the tractor may become inclined at different angles, so that the bottom of the cart comes in contact with the top of the tractor, which hinders traveling.

In addition, in the conventional under-cart type guided tractor, an undivided rigid plate-like frame is used generally. Therefore, when the floor surface has large irregularities, there is, for example, a risk that when the tractor proceeds from a downward slope to an upward slope, the driving wheels are lifted from the floor surface, so that the tractor becomes uncontrollable. On the other hand, when the tractor proceeds from an upward slope to a downward slope, there is a risk that the distance between the sensor, which is usually placed at a front portion of the tractor as viewed from the perspective of the tractor's traveling direction, and the guide element, such as a magnetic tape, increases, to the extent that the tractor becomes uncontrollable.

Thus, the object of the present invention is to provide an under-cart type guided tractor that has a frame capable of being bent, supported by a fulcrum, that can therefore travel smoothly even on a floor surface having large irregularities, such as slopes, waves or the like, without using a special suspension mechanism for the driving wheels or free wheels adapted to traveling on the floor surface along with the driving wheels, and that can draw a cart safely without the vertical load of the cart acting on the tractor at all.

SUMMARY OF THE INVENTION

An under-cart type guided tractor according to the present invention comprised of a frame provided with a driving unit including driving wheels on the underside, adapted to travel guided by a guide signal sent out from a guide element such as a magnetic tape laid along a traveling path on a floor surface, and to draw a cart provided with free wheels and loaded with goods, with the guided tractor located under a load-carrying platform of the cart.

The frame of the guided tractor has a height that allows the guided tractor to move under a frame of the cart, and a structure that does not allow the vertical load of the cart to act on the guided tractor. The frame of the guided tractor comprises at least two separate frame components that are arranged in line in the guided tractor's travelling direction and joined by a pin in such a manner that the frame components are allowed to bend in an upward or downward fashion. The frame of the guided tractor is provided with free wheels that are adapted to travel on the floor surface along with the driving wheels. The frame components are equipped with a clamp mechanism capable of being raised and lowered, and the clamp mechanism is adapted to rise and clamp the frame of the cart when the guided tractor has come to an appropriate position under the frame of the cart. A sensor is provided at a portion suitable for detecting the guide signal sent out from the guide element such as a magnetic tape.

In the under-cart type guided tractor according to the present invention, the frame of the guided tractor may comprise two separate front and rear frame components. Each of the frame components is provided with free wheels on the left and right sides, and the free wheels are adapted to travel on the floor surface along with the driving wheels. The driving unit is located near the portion of the guided tractor that is adapted to form a bend in the frame. Sensors are provided at a front central portion of the front frame component and at a rear central portion of the rear frame component.

In the under-cart type guided tractor according to the present invention, the frame of the guided tractor may also be comprised of three separate front, middle and rear frame components. Each of the front and rear frame components is provided with free wheels on the left and right side, and the free wheels are adapted to travel on the floor surface along with the driving wheels. The middle frame component is equipped with a clamp mechanism. Steering driving units are provided as the driving units at the front and rear frame components, and sensors are provided in the front and back of each of the steering driving units.

The free wheels provided at the frame of the guided tractor and the cart may be spring casters.

The above-described under-cart type guided tractor according to the present invention can travel smoothly not only on a horizontal floor surface but also on a floor surface having large irregularities, such as slopes, waves or the like, even without using a special suspension mechanism for the driving wheels or the free wheels adapted to travel along with the driving wheels, and can draw a cart safely without the vertical load of the cart acting on the guided tractor at all.

EXAMPLES OF EMBODIMENT OF THE INVENTION

Figure 1:
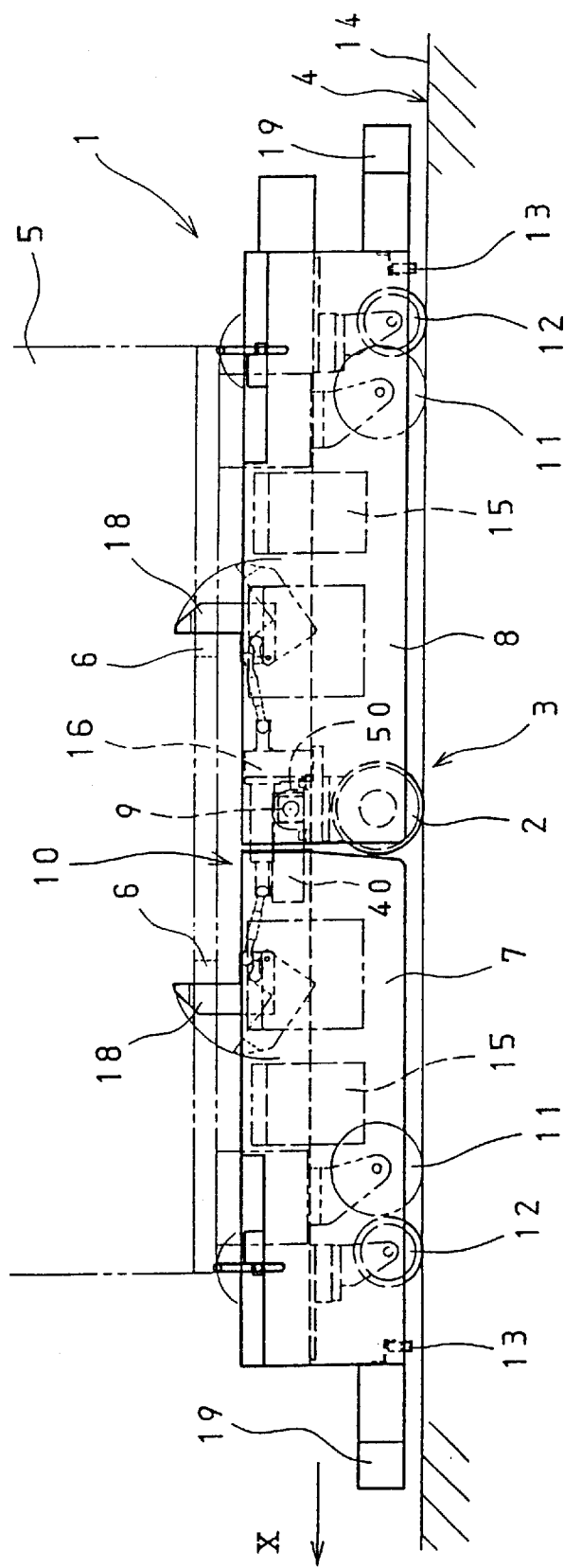
FIG. 1 is a front view of an embodiment of an under-cart type guided tractor according to the present invention.
Figure 2:
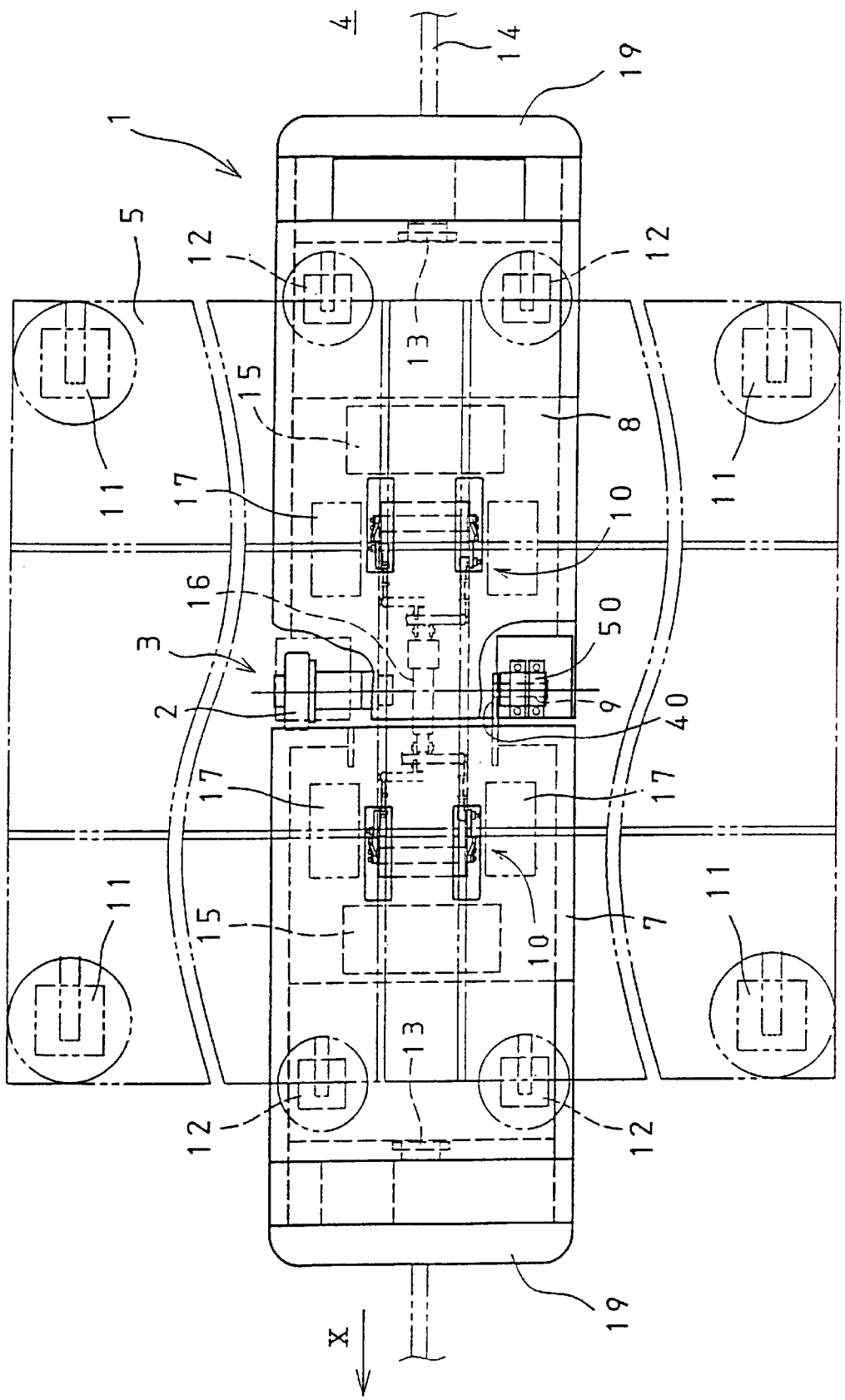
FIG. 2 is a plan view of the embodiment shown in FIG. 1.

FIGS. 1 and 2 show an embodiment of an under-cart type guided tractor according to the present invention.

The under-cart type guided tractor comprises a frame 1 provided with a driving unit 3 including driving wheels 2 on its underside. It is adapted to travel guided by a guide signal sent out from a guide element such as a magnetic tape 14 laid along a traveling path on a floor surface 4, and to draw a cart 5 provided with free wheels 11 and loaded with goods, with the guided tractor located under the load-carrying platform of the cart 5. The under-cart type guided tractor has the following features:

The frame 1 has a height that allows the guided tractor to move under a frame 6 of the cart 5, and a structure that does not allow the vertical load of the cart 5 to act on the guided tractor;

The frame 1 comprises at least two separate frame components 7, 8 that are arranged in line in the guided tractor's travelling direction and joined by a pin 9 in a manner such that the frame components 7, 8 are allowed to take an upward or downward bent formation;

The frame 1 is provided with free wheels 12 that are adapted to travel on the floor surface 4 along with the driving wheels 2;

The frame components 7, 8 are equipped with a clamp mechanism 10 capable of being raised and lowered, and the clamp mechanism is adapted to rise and clamp the frame 6 of the cart 5 when the guided tractor has come to an appropriate position under the frame of the cart 5; and A sensor 13 is provided at a portion suitable for detecting the guide signal sent out from the guide element such as the magnetic tape 14.

Specifically, the under-cart type guided tractor shown in FIGS. 1 and 2 is a tractor able to travel forward and backward. It is a tractor called a "double bent type," where the frame 1 comprises two separate front and rear frame components 7, 8. Each of the frame components 7, 8 is provided with free wheels (universal casters) 12 on the left and right side, more specifically, four free wheels 12 in total, one at each of the four corners of the frame. The free wheels are the types that are easy to steer, and adapted to travel on the floor surface along with the driving wheels 2. The driving unit 3 is located near the portion of the frame 1 that is adapted to bend. The sensors 13 are provided at a front central portion of the front frame component 7 and at a rear central portion of the rear frame component 8.

More specifically, the driving unit 3 comprises the driving wheels 2 and a motor (not shown) for driving the driving wheels 2, and it uses an outer frame element of the rear frame component 8, in a manner such that the driving unit 3 occupies the left and right of the center of gravity of the frame 1 (center of FIG. 2) as viewed in a plane. The driving unit 3 comprised of the driving wheels 2 and the motor performs steering using the so-called "two-wheel speed difference method."

The frame components 7 and 8 are made of steel, and have substantially the same size. The frame components 7 and 8 are so joined that they may occupy the front and back of the center of gravity of the frame 1 (center of FIG. 2), respectively, as viewed in a plane. Here, the driving wheels 2, 2 are provided on both sides of the underside of the front portion of the outer frame element of the rear frame component 8. Over the driving wheels 2, 2, bearings 50, 50 are provided at a level lower than the upper surface of the frame 1. Further, plate-like bearings 40, 40 are provided at a rear portion of an outer frame element of the front frame component 7 in a manner that they extend parallel to the inner sides of the bearings 50, 50. The front frame component 7 and the rear frame component 8 are joined by the pin shaft 9 in a manner such that they are allowed to take an upward or downward bent formation. The axial direction of the pin shaft 9 is parallel to the traveling surface and perpendicular to the frame's traveling direction.

Needless to say, it can be so arranged that the bearings 40, 40 may be provided at an extension of the outer frame element of the front frame component 7, corresponding to the bearings 50, 50 provided at the rear frame component 8.

The clamp mechanism 10 is provided substantially at the center of the frame 1 to extend over both of the frame components 7, 8. The clamp mechanism 10 is controlled to be raised and lowered by a control device 16 including an electro-hydraulic cylinder that is provided at the center of the frame 1 to extend substantially horizontally (hereinafter referred to simply as "cylinder"). The clamp mechanism 10 has four clamps 18, that is, two clamps 18 arranged on the left to face each other, and two clamps 18 arranged on the right to face each other. Each clamp 18 is adapted to be raised from the outward to the inward directions. The clamps 18 have enough rigidity to draw the cart 5.

In order to ensure that the surface friction required to smoothly draw the cart 5 acts on the driving wheels 2, the illustrated guided tractor has four weights 17 of iron that are arranged in front and back of each driving wheel 2. Specifically, the iron weights 17 are arranged on the left and right of the rear portion of the front frame component 7 in a well-balanced manner, and on the left and right of the front portion of the rear frame component 8 in a well-balanced. The means to ensure that the required surface friction acts on the driving wheels 2 is not restricted to the above. The weights 17 are not required if it is so arranged that the front frame component 7 has its center of gravity in its rear portion and the rear frame component 8 has its center of gravity in its front portion.

In the present embodiment, the magnetic tape 14 is used as the guide element. However, the guide element is not restricted to the magnetic tape 14. An electrical wire, a magnetic element or an optical guide tape can be used in a similar manner. In FIG. 2, reference numeral 15 denotes a power supply battery, and reference numeral 19 denotes a bumper that has an obstacle detecting switch function to stop the guided tractor when the guided tractor comes in contact with an obstacle.

Next, the functioning of the under-cart type guided tractor having the above-described structure works is described.

Software for the control device is so established that the under-cart type guided tractor having the above-described structure starts working with a start signal from a host controller using a photoelectric sensor or radio transmission, and then continues working automatically in a manner described below until it detects the magnetic tape or the like laid along the travelling path indicating a stop position.

Needless to say, it can be so arranged that the guided tractor is started or stopped by an operator operating a button. The control device is usually placed at the portion of the tractor where the control device does not hinder the tractor in its drawing work. Since the control device is not particularly new, it is not shown in the drawings.

When the under-cart type guided tractor is to travel forward in the "X" direction in the drawings, it moves as follows: The sensor 13 provided at the front central portion of the front frame component 7 detects the intensity and direction of magnetism from the magnetic tape 14 laid along the traveling path on the floor surface. The guided tractor travels automatically by being guided magnetically, in a manner that the driving wheels 2, 2 are steered by the automatically controlled driving motor so that the left end (or right end) of the magnetic tape 14 may be detected by the sensor 13 in a fixed position. When the guided tractor has come under the cart 5, a sensor or the like attached to the frame 1 detects a cart 5 drawing position (stop position), and the guided tractor slows down and stops. Then, the cylinder 16 of the clamp mechanism 10 expands, so that the clamps 18, 18 are raised and come in contact with frame elements 6, 6 of the cart 5 and hold them. Then, the sensor 13 detects the magnetic tape 14, and under the control of the software, the tractor travels pushing the frame 6 of the cart 5 to the left. Thus, the cart 5 is drawn in the "X" direction in the drawings.

When the tractor arrives at a predetermined position, the sensor detects the magnetic tape 14 or the like indicating a stop position on the traveling path. With that, the cylinder 16 of the clamp mechanism 10 works to release the clamps 18, 18 from the frame elements of the cart 5. The tractor moves through under the cart 5 forward or backward, and waits for the next task.

When the under-cart type guided tractor travels on a horizontal floor surface 4, the under-cart type guided tractor can automatically travel smoothly on the floor surface 4 with the driving wheels 2 of the tractor and with the free wheels 12 of the tractor and the free wheels 11 of the cart 5 that are adapted to travel with the driving wheels 2, pushing the frame 6 of the cart 5 with the clamps 18 of the clamp mechanism 10.

Figure 3A:
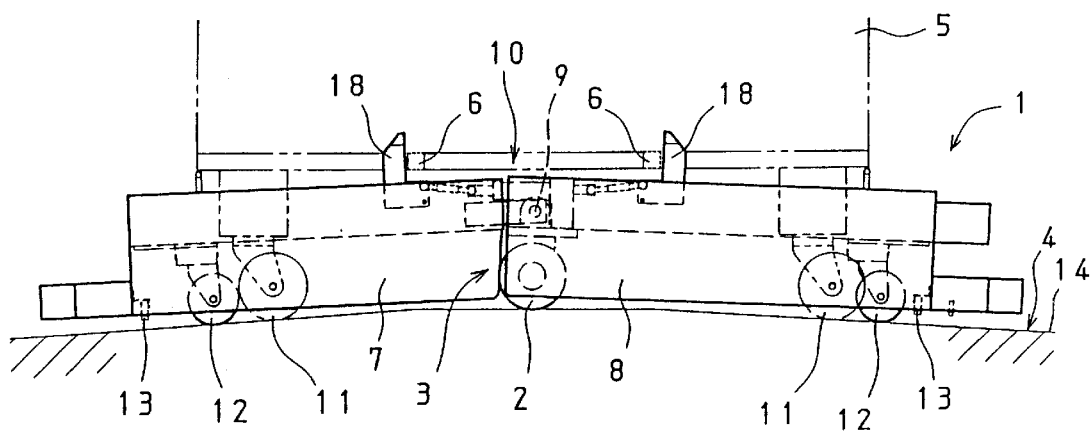
FIGS. 3A and 3B are front views for showing how the embodiment shown in FIGS. 1 and 2 travels.
Figure 3B:
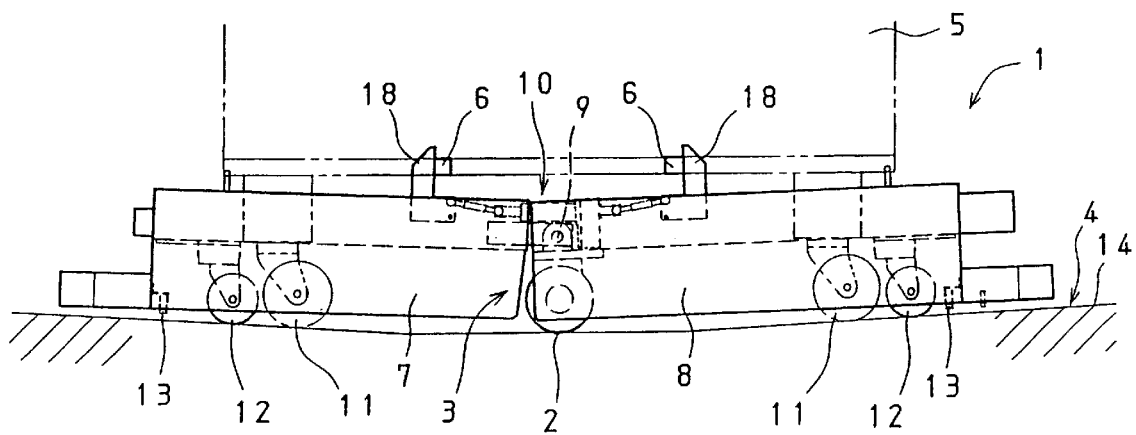

When the tractor travels over large irregularities in the surface, or for example, proceeds from an upward slope to a downward slope, the frame 1 comprising the frame components joined by the pin shaft 9 is bent upward as shown in FIG. 3A, so that the free wheels 12 of the front frame component 7 are prevented from being lifted from the floor surface 4. Therefore, the distance between the sensor 13 provided at the front portion of the frame 1 and the magnetic tape 14 is always kept constant and there is no risk that the tractor becomes uncontrollable. Thus, the tractor can travel as smoothly as when it travels on a horizontal floor surface. On the other hand, when the tractor proceeds from a downward slope to an upward slope, the frame 1 comprising the frame components joined by the pin shaft 9 is bent downward as shown in FIG. 3B, so that the driving wheels 2 are prevented from getting lifted from the floor surface 4. Since the driving wheels 2 always travel in contact with the floor surface, the surface friction required to draw the cart 5 smoothly is always present. Thus, there is no risk that the tractor might become uncontrollable, and the tractor can travel as smoothly as when it travels on a horizontal floor surface.

When the under-cart type guided tractor is to travel backward, it can travel automatically in a manner similar to the above-described manner. Specifically, the sensor 13 provided at the rear central portion of the rear frame component 8 detects the intensity and direction of magnetism from the magnetic tape 14. The guided tractor travels automatically by being guided magnetically, in a manner that the driving wheels 2, 2 are steered by the automatically controlled driving motor so that the left end (or right end) of the magnetic tape 14 may be detected by the sensor 13 in a fixed position. When the guided tractor has come under the cart 5, a sensor or the like attached to the frame 1 detects a cart 5 drawing position (stop position), and the guided tractor slows down and stops. Then, the cylinder 16 of the clamp mechanism 10 expands, so that the clamps 18, 18 are raised and come in contact with the frame elements 6, 6 of the cart 5 and hold them. Then, the sensor 13 detects the magnetic tape 14, and the tractor travels pushing the frame 6 to the right. Thus, the cart 5 is drawn to the right 5.

The under-cart type guided tractor traveling backward can not only travel smoothly on a horizontal floor surface. It can also travel smoothly over large irregularities in the surface, or from an upward slope to a downward slope, and from a downward slope to an upward slope. Because the frame 1 comprising the frame components joined by the pin shaft 9 is bent upward (or downward) as shown in FIGS. 3A and 3B, the tractor can travel over large irregularities in the surface as smoothly as when it travels on a horizontal floor surface.

If spring casters are used for the free wheels 12 of the frame 1 and the free wheels 11 of the cart 5, the frame 1 and the cart 5 can travel well enough on a floor surface 4 with waves.

Figure 4:
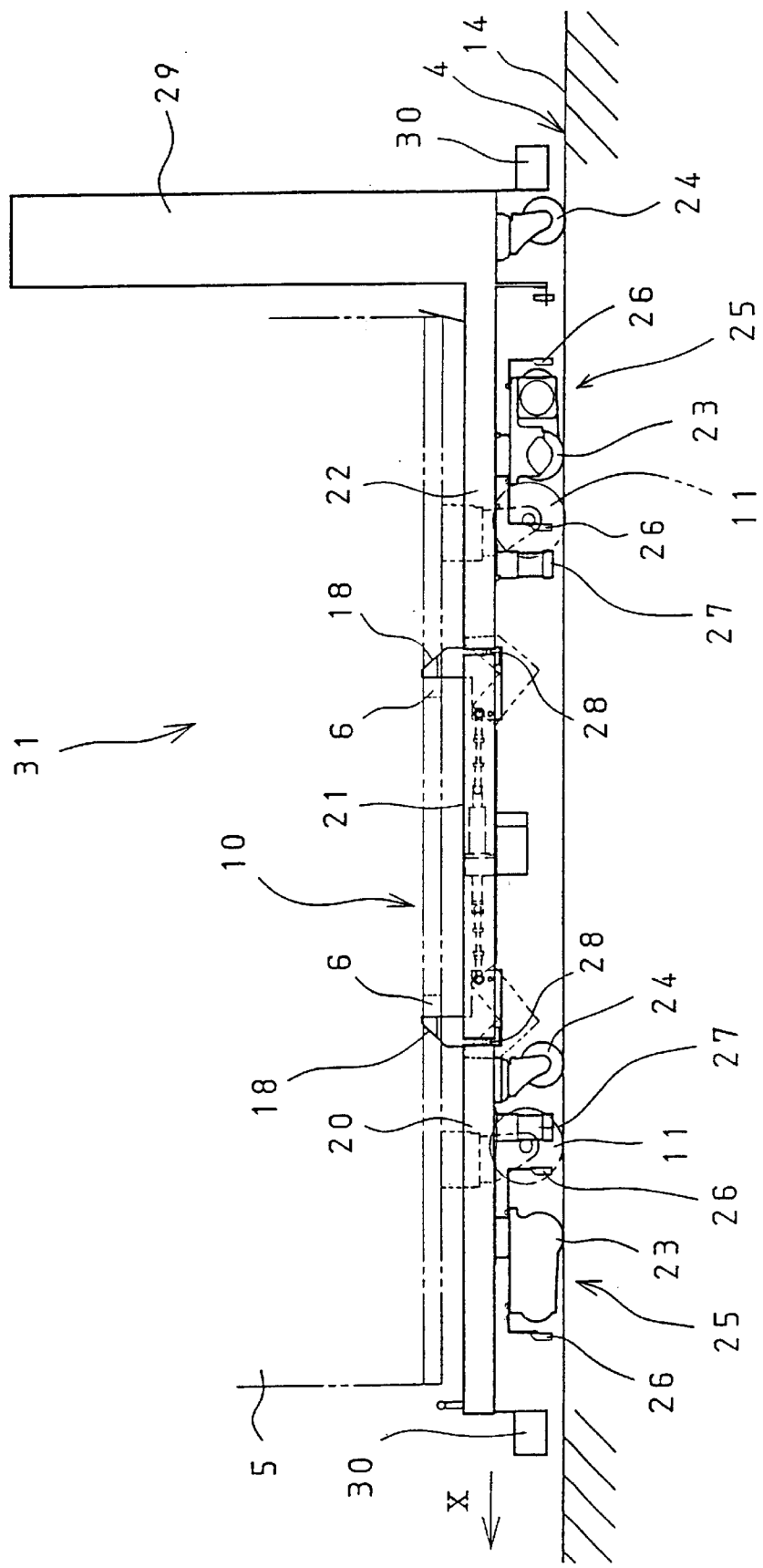
FIG. 4 is a front view of further embodiment of the under-cart type guided tractor according to the present invention.
Figure 5:
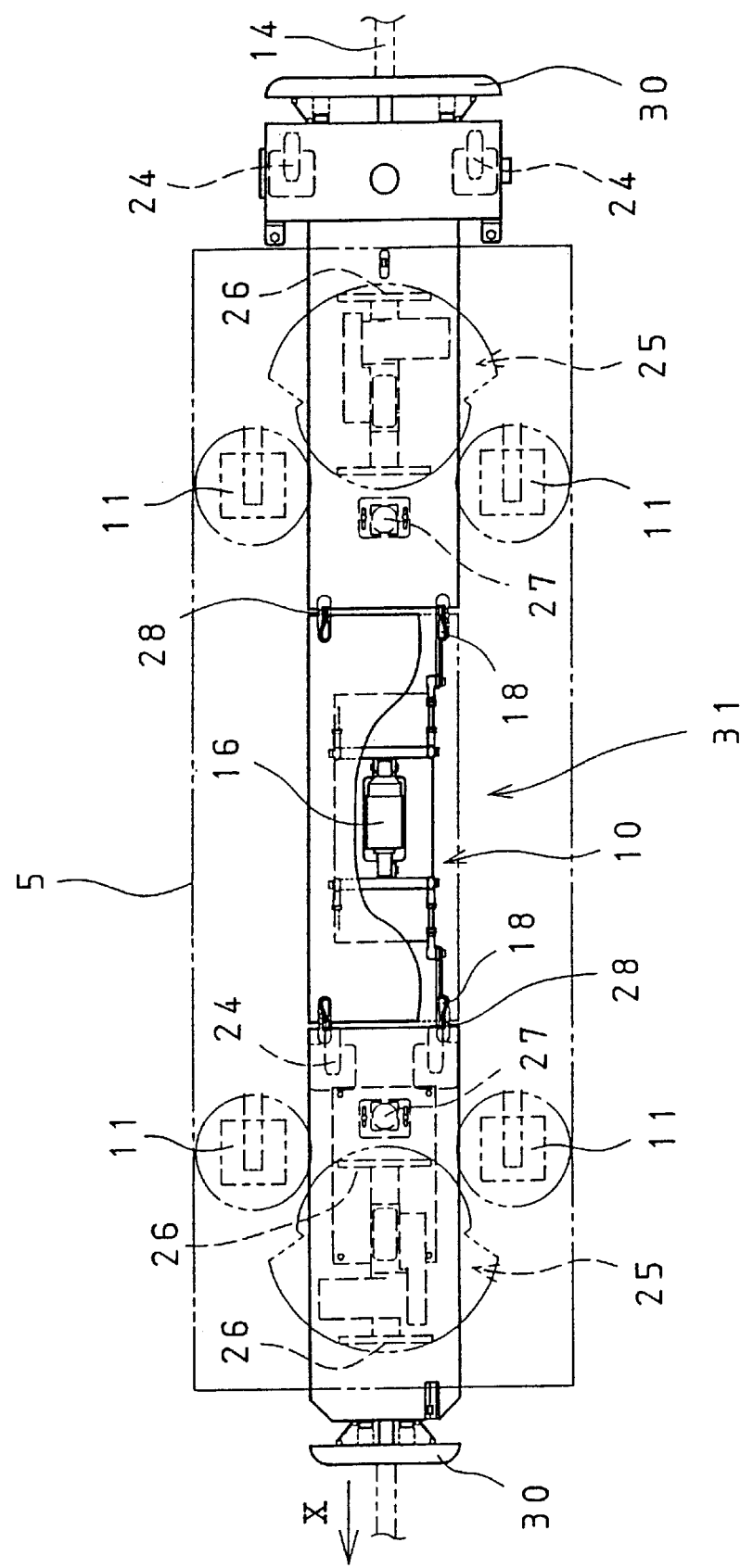
FIG. 5 is a plan view of the embodiment shown FIG. 4.

FIGS. 4 and 5 shows another embodiment of the under-cart guided tractor according to the invention.

The under-cart guided tractor shown there is a tractor called a "triple bent type", where a frame 31 comprises three separate frame components, that is, front, middle and rear frame components 20, 21, 22. Each of the front and rear frame components 20 and 22 is provided with free wheels 24 on the left and right of its rear portion, thus, four free wheels 12 in total are provided. The free wheels are the types that are easy to steer, and adapted to travel with driving wheels 23. A clamp mechanism 10 is provided at the middle frame component 21. As the driving units, two steering driving units 25 are provided at the front and rear frame components 20 and 22. Sensors 26, 26 are provided in front and back of each of the steering driving units 25, 25.

Reference numeral 27 denotes steering motors that can revolve forward and backward to enable the associated steering driving units 25, 25 to perform a steering function. The steering driving unit 25 provided with the sensor 26 and the steering motor 27 is similar to the magnetically guided steering driving unit for use in a magnetically guided cart that was proposed by the present inventor(s) and disclosed in Japanese Patent Unexamined Publication Hei 10-39925. Therefore, the explanation of the steering driving unit 25 is omitted.

The frame components 20, 21, 22 are made of steel. The adjoining portions of the frame components have a structure similar to that of the preceding embodiment, and the frame components are joined by pin shafts 28. The axes of the pin shafts 28 extend parallel to the traveling surface and perpendicular to the frame's traveling direction. The frame components 20, 21 and 22 are joined in a manner that the frame components can take a bent formation only upward or downward.

The clamp mechanism 10 is the same as the clamp mechanism 10 shown in FIGS. 1 and 2. Therefore, the explanation thereof is omitted.

In order to ensure that the surface friction required to smoothly draw the cart 5 acts on the driving wheels 23, the illustrated guided tractor has iron weights (not shown) that are arranged at the front and rear frame components 20, 22 in a well-balanced manner.

Also in the present embodiment, a magnetic tape 14 is used as the guide element. However, the guide element is not restricted to the magnetic tape 14. An electrical wire, a magnetic element or an optical guide tape can be used in a similar manner. In FIGS. 4 and 5, reference numeral 30 denotes a bumper that has an obstacle detecting switch function as mentioned in the preceding embodiment.

The triple-bent under-cart type guided tractor works in substantially the same way as the double-bent under-cart type guided tractor shown in FIGS. 1 and 2.

Specifically, software for a control device 29 is provided so that the triple-bent under-cart type guided tractor starts working with a start signal from a host controller using a photoelectric sensor or radio transmission, and then continues working automatically in a manner described below until it detects a magnetic tape or the like laid along the travelling path indicating a stop position.

When the triple-bent under-cart type guided tractor is to travel forward in the "X" direction in the drawings, it moves as follows: The front sensors 26, 26 arranged in front of the steering driving units 25, 25 provided at the front and rear frame components 20, 22 detect the intensity and direction of magnetism from the magnetic tape 14 laid along the traveling path on the floor surface 4. The guided tractor travels automatically by being guided magnetically, in a manner such that the steering driving units 25, 25 are steered by the automatically controlled steering motor 27, 27 so that the left end (or right end) of the magnetic tape 14 may be detected by the sensors 26, 26 in a fixed position. When the guided tractor has come under the cart 5, a sensor or the like detects the cart 5 drawing position (stop position), and the guided tractor slows down and stops. Then, the cylinder 16 of the clamp mechanism 10 expands, so that the clamps 18, 18 are raised and come into contact with frame elements 6, 6 of the cart 5 and hold them. Then, the sensors 26, 26 detect the magnetic tape 14, and the tractor travels pushing the frame 6 of the cart 5 to the left. Thus, the cart 5 is drawn in X direction in the drawings.

The tractor moves until the sensors detect the magnetic tape 14 or the like indicating a stop position on the traveling path. With that, the cylinder 16 of the clamp mechanism 10 works to release the clamps 18, 18 from the frame elements of the cart 5. The tractor moves through under the cart 5 to the side opposite to the control device 29, and waits for the next task.

When the triple-bent under-cart type guided tractor travels on a horizontal floor surface 4, the triple-bent under-cart type guided tractor can automatically travel smoothly on the floor surface with the driving wheels 23, 23 of the tractor and with the free wheels 12 of the tractor and the free wheels 11 of the cart 5 that are adapted to travel with the driving wheels 23, 23, pushing the frame 6 of the cart 5 with the clamps 18 of the clamp mechanism 10.

Figure 6:
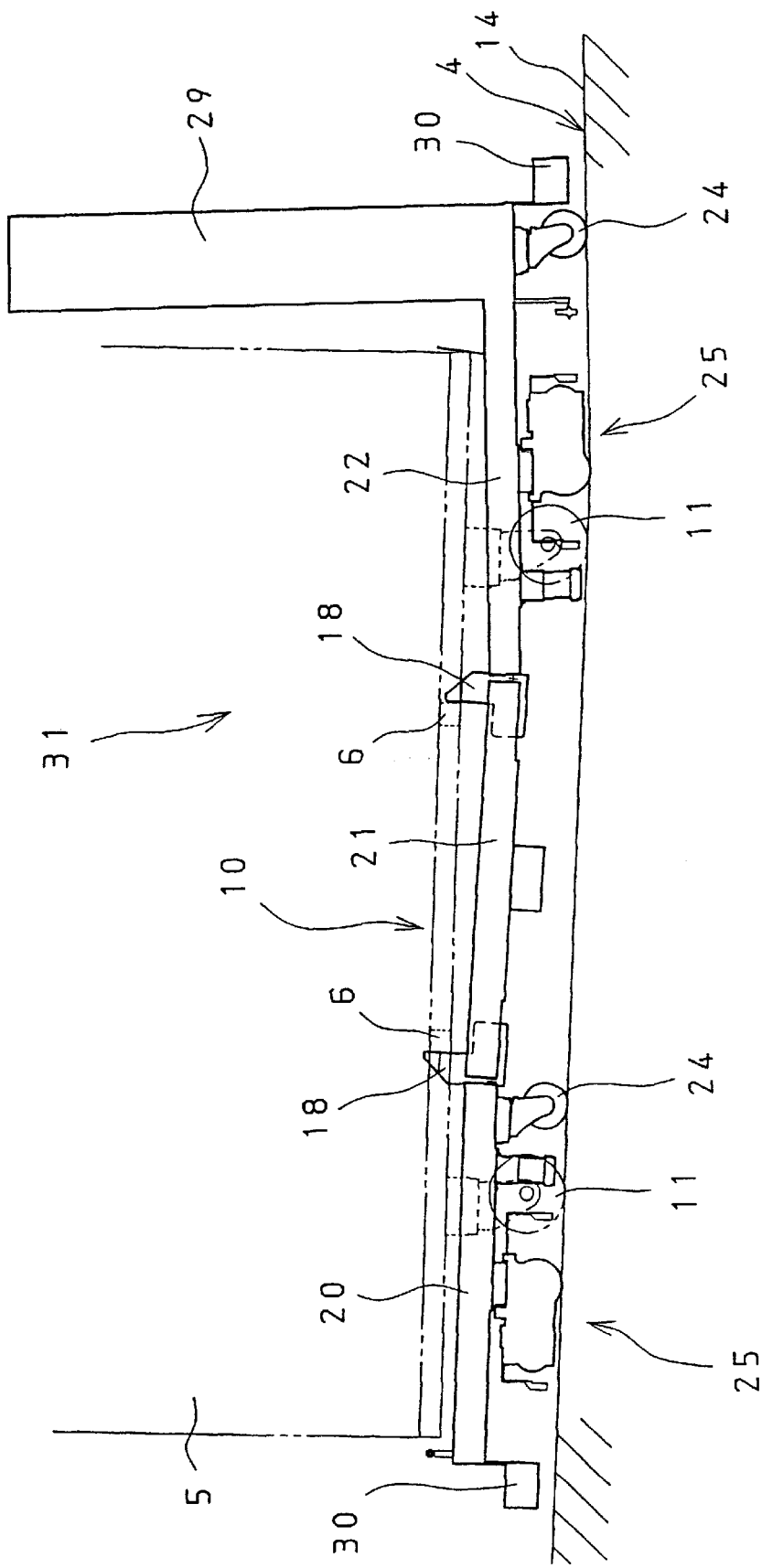
FIG. 6 is a front view for showing how the embodiment shown in FIGS. 4 and 5 travels.
Figure 7:
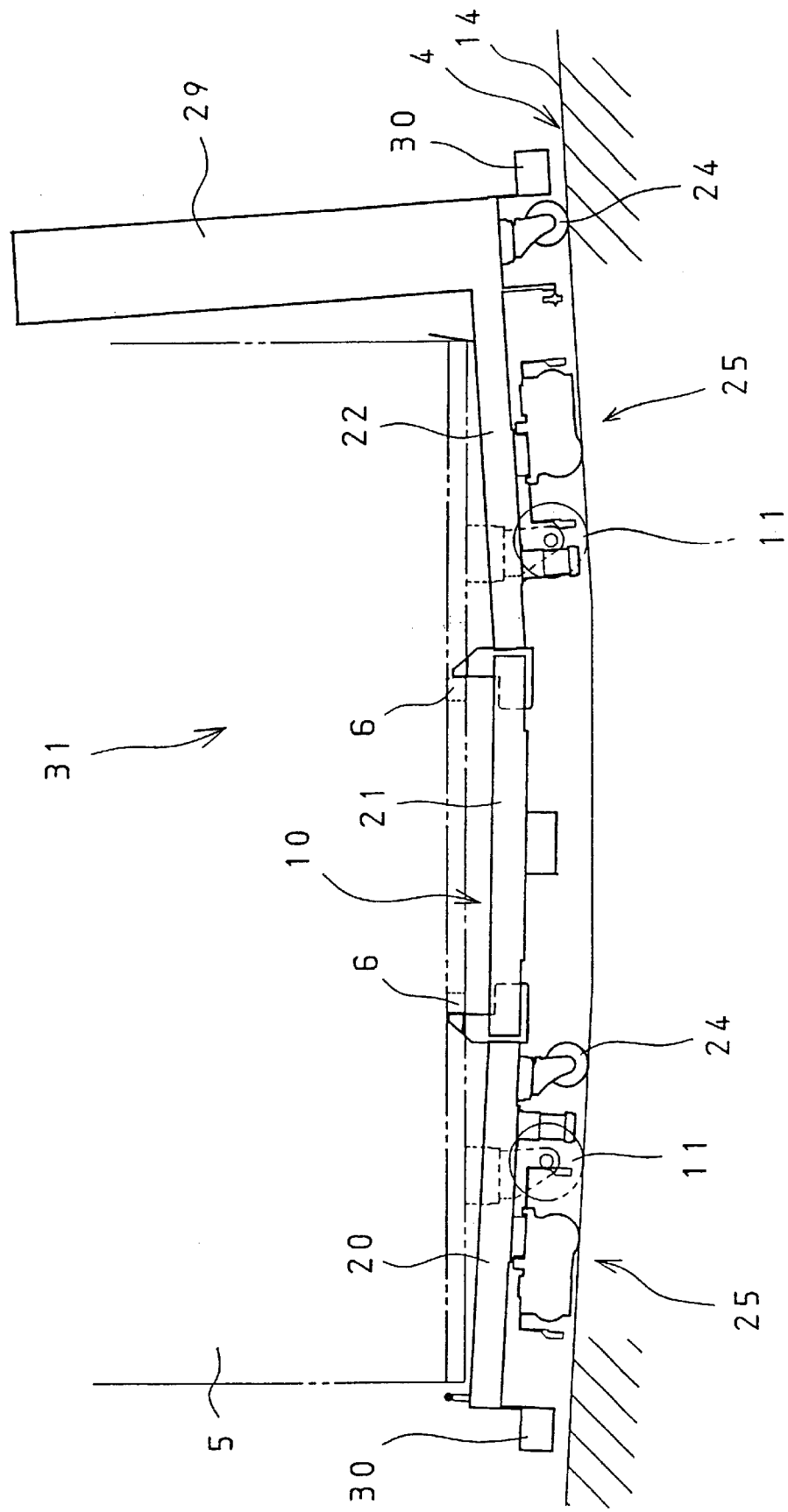
FIG. 7 is a front view for showing how the embodiment shown in FIGS. 4 and 5 travels.

When the tractor travels over large irregularities in the surface, for example, proceeding from an upward slope to a downward slope, the frame 31 comprising the frame components joined by the pin shafts 28 is bent upward as shown in FIG. 6, so that the driving wheels 23, 23 of the front and rear frame components 20, 22 are prevented from being lifted from the floor surface 4. Therefore, the distance between the front sensors 26, 26 provided in front of the steering driving units 25, 25 and the magnetic tape 14 is always kept constant and there is no risk that the tractor may become uncontrollable. Thus, the tractor travels as smoothly as when it travels on a horizontal floor surface. On the other hand, when the tractor proceeds from a downward slope to an upward slope, the frame 31 comprising the frame components joined by the pin shafts 28 is bent downward as shown in FIG. 7, so that the driving wheels 23, 23 are prevented from being lifted from the floor surface 4. Since the driving wheels 23, 23 always travels in contact with the floor surface, the surface friction required to draw the cart 5 smoothly is always present. Thus, there is no risk that the tractor may become uncontrollable, and the tractor travels as smoothly as when it travels on a horizontal surface.

When the under-cart type guided tractor is to travel backward, it can also travel automatically, substantially in the same manner as described above. The explanation thereof is therefore omitted.

As in the case of the double-bent under-cart type guided tractor described above, if spring casters are used for the free wheels 24 of the frame 31 and the free wheels 11 of the cart 5, the frame 1 and the cart 5 is able to travel well enough on a floor surface 4 having waves.

Figure 8:
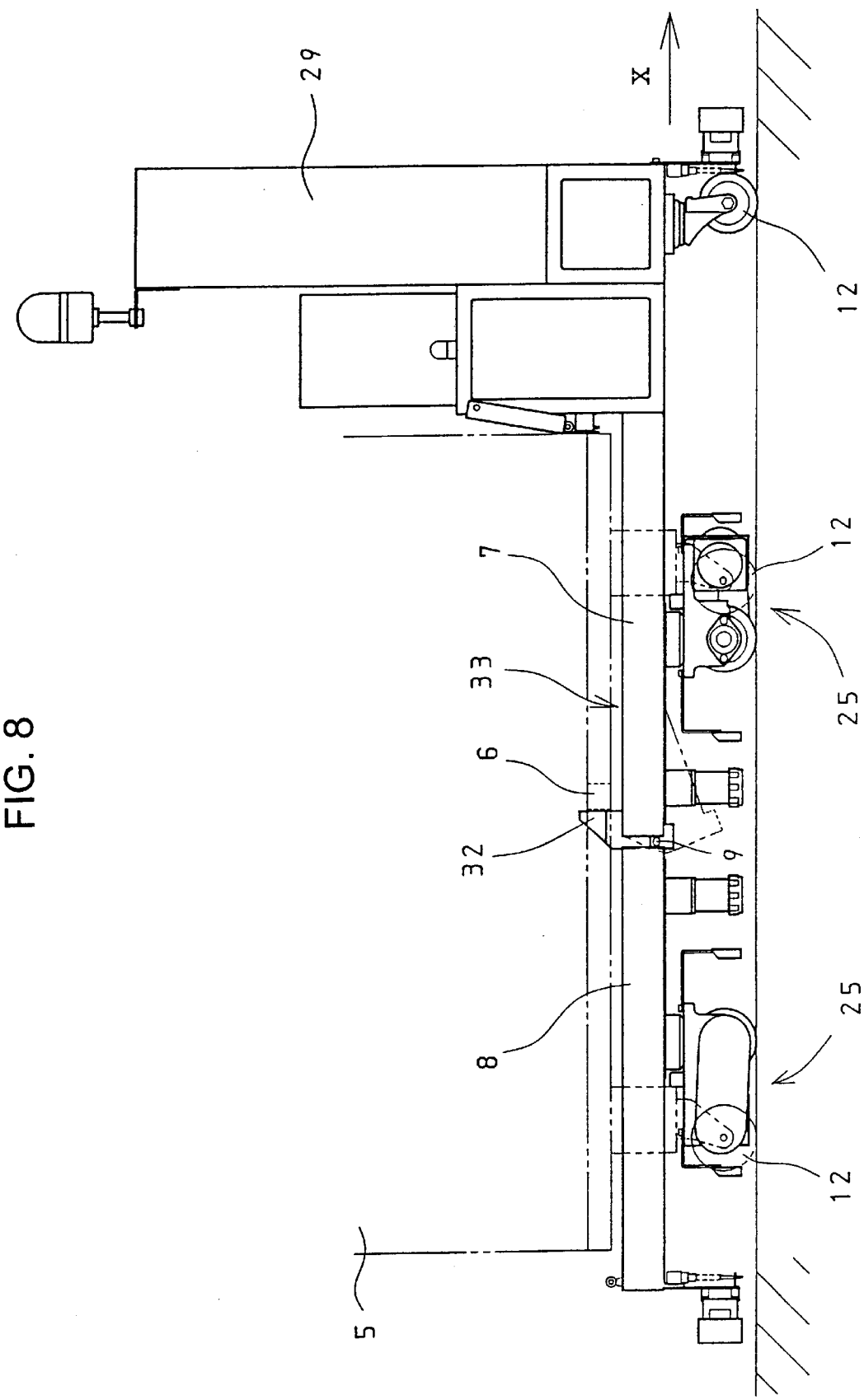
FIG. 8 is a front view of further embodiment of the under-cart type guided tractor according to the present invention.

The embodiments have been described based on the drawings. It is to be noted that the present invention is not restricted to the embodiments shown in the drawings. The present invention encompasses variations that a person skilled in the art would ordinarily produce by modifying and/or making use of the above embodiments without departing from their technical essence. For example, as shown in FIG. 8, steering driving units 25, 25 as shown in FIGS. 4 to 7 may be provided at the front and rear frame components 7, 8 of the double-bent under-cart type guided tractor as shown in FIGS. 1 to 3. Further, the clamp mechanism 10 is not restricted to the structure adapted to fasten the cart from both sides. As shown in FIG. 8, a clamp mechanism 33 having a clamp 32 only on one side can be used, as long as the structure of a tractor allows the same. The clamp 32 is released from the drawing work in a similar manner. The explanation thereof will be therefore omitted. Further, the illustrated embodiments are a double-bent type and a triple-bent type, but the present invention is not restricted to them. It goes without saying that the present invention may be embodied, for example, as a quadruple bent type or a quintuple bent type.

What is claimed is:

1. An under-cart guided tractor adapted to travel guided by a guide signal sent out from a guide element laid along a traveling path on a floor surface, and to draw a cart provided with free wheels and loaded with goods, in a state such that said guided tractor is located under a load-carrying platform of said cart, comprising:

a chassis provided with a driving unit including driving wheels on an underside thereof, wherein said chassis of said guided tractor has a height lower than the underside of the cart chassis, which allows said guided tractor to move under a chassis of said cart, and wherein said chassis of said guided tractor has a structure that does not allow a vertical load of said cart to act on said guided tractor, wherein said chassis of said guided tractor comprises at least two separate chassis components that are arranged in line in a travelling direction of said guided tractor and joined by a horizontal pin, and said driving wheels of said driving unit are on the underside of said guided tractor and near a portion of said horizontal pin in a manner such that said chassis components are allowed to take an upward or downward bent formation, said chassis of said guided tractor is provided with free wheels that are adapted to travel on said floor surface along with said driving wheels, said chassis of said guided tractor is equipped with a clamp mechanism capable of being raised and lowered, said clamp mechanism being adapted to be raised and to clamp said chassis of said cart when said guided tractor has come to a position under said chassis of said cart, and a sensor is provided at a portion suitable for detecting said guide signal sent out from said guide element.

2. An under-cart guided tractor according to claim 1, wherein said chassis of said guided tractor comprises two separate front and rear chassis components, each of said front and rear chassis components is provided with free wheels on a left and right side thereof, said free wheels being adapted to travel on said floor surface along with said driving wheels, said driving wheels of said driving unit is located near a portion that forms a bend of said bent formation of said chassis of said guided tractor, and sensors are provided at a front central portion of said front chassis component and at a rear central portion of said rear chassis component.

3. An under-cart guided tractor according to claim 1, wherein said chassis of said guided tractor comprises three separate front, middle and rear chassis components, each of said front and rear chassis components is provided with free wheels on a left and right side thereof, said free wheels being adapted to travel on said floor surface along with said driving wheels, said middle chassis component is equipped with a clamp mechanism, steering driving units are provided as driving units at said front and rear chassis components, and sensors are provided in front and back of each of said steering driving units.

4. An under-cart guided tractor according to claim 1, wherein said free wheels provided at said chassis of said guided tractor and said cart are spring casters.

5. An under-cart guided tractor according to claim 2, wherein said free wheels provided at said chassis of said guided tractor and said cart are spring casters.

6. An under-cart guided tractor according to claim 3, wherein said free wheels provided at said chassis of said guided tractor and said cart are spring casters.

7. An under-cart guided tractor according to claim 1, wherein said guide element comprises a magnetic tape.

8. An under-cart guided tractor according to claim 2, wherein said guide element comprises a magnetic tape.

9. An under-cart guided tractor according to claim 3, wherein said guide element comprises a magnetic tape.

10. An under-cart guided tractor according to claim 4, wherein said guide element comprises a magnetic tape.

11. An under-cart guided tractor according to claim 5, wherein said guide element comprises a magnetic tape.

12. An under-cart guided tractor according to claim 6, wherein said guide element comprises a magnetic tape.

\* \* \* \* \*